June 20, 1972 R. BABIGAN Re. 27,397

ELECTRICAL CONDUCTOR CONTAINING AN IONIZABLE GAS
RADIOACTIVE MATERIAL TO IONIZE THE GAS
Filed April 9, 1965

INVENTOR
Raymond Babigan

United States Patent Office

Re. 27,397
Reissued June 20, 1972

27,397

ELECTRICAL CONDUCTOR CONTAINING AN IONIZABLE GAS AND RADIOACTIVE MATERIAL TO IONIZE THE GAS

Raymond Babigan, 4804 45th St. NW., Washington, D.C. 20016

Original No. 3,361,866, dated Jan. 2, 1968, Ser. No. 446,889, Apr. 9, 1965. Application for reissue Dec. 31, 1969, Ser. No. 889,754
Int. Cl. H01b *1/00, 5/00, 9/00*
U.S. Cl. 174—9 F 17 Claims

Matter enclosed in heavy brackets [ ] appears in the original patent but forms no part of this reissue specification; matter printed in italics indicates the additions made by reissue.

*ABSTRACT OF THE DISCLOSURE*

*A long distance electrical conductor comprises a metallic housing and a metallic wire within and spaced from the housing. A perforated metal member which may comprise an aluminum screen is positioned between the housing and wire. An ionizable gas may be included in the space between the housing and wire.*

This invention relates to an electrical conductor and more particularly to an electrical conductor assembly for use in the long distance transmission of electricity.

The desirability of efficiently transmitting electrical energy over long distances has long been known. Among the main advantages are that electrical energy can be generated for example at a coal mine and distributed without the necessity of transporting the coal. Also since it is not uncommon for hydroelectric power sources to be located at great distances from large users of electrical energy, an efficient method and structure for transmitting such energy over long distances would be of considerable economic value.

One of the limiting factors in long distance transmission of electricity is in the conductor structure. If, for example the cross-sectional area of the conductor could be increased, the long distance transmission efficiency would be enhanced. However, it is not practical or economically feasible to increase the diameter, or in other words the cross-sectional area, of a solid metallic wire conductor for the reason that the greatly increased weight and increased cost of such a wire, as well as the increased cost of structure for its support would more than offset its advantages.

Attempts have been made heretofore to construct a large diameter, relatively low weight conductor, but such attempts have not met with success.

It is an object of my invention therefore to construct a large diameter, relatively low weight electricity conductor especially suitable for long distance transmission of electrical energy.

It is a further object of my invention to construct a composite electricity conductor in which both metal and ionized gas utilized to conduct electricity.

It is a further object of my invention to utilize in association with a metallic conductor, a gaseous electricity conducting medium which is ionized by radioactive means.

A further object of my invention is to provide a commercial use for spent, waste radioactive fuel which is now discarded.

A further object is to construct a suitable supporting structure for the conductor of my invention.

Other objects and further features of novelty and invention will be pointed out or will be evident to those skilled in the art from a reading of the following specification in conjunction with the accompanying drawings, in which:

FIG. 1. is a perspective view of one embodiment of my invention,

Figure 1:
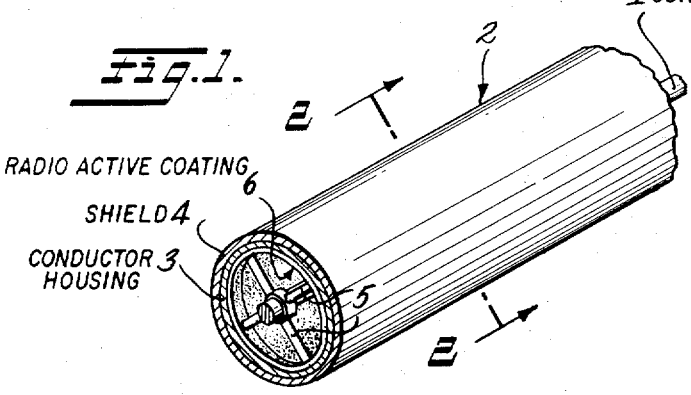
Figure 2:
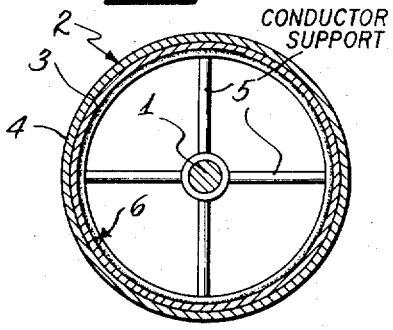
FIG. 2 is a cross-section along the line 2—2 of FIG. 1.

In FIGS. 1 and 2 there is shown an electrical conductor as a metallic wire or rod 1 which is encompassed by a metallic housing 3. Preferably the wire 1 and housing 3 may be of copper or aluminum although other metals may be utilized in accordance with design preferences. Housing 3 is supported from the wire 1 by rod or spider elements 5 which are made of electrically conductive metal so that the housing and wire are in electrically conductive relationship.

The inner surface of the housing has associated therewith radioactive material 6 either in the form of a coating or in the form of a surface alloy. The natural and artificial radioactive elements are important sources of ionizing radiation. I prefer to utilize spent fuel elements because they are an abundant source of ionizing radiation and because of the fact that they constitute a low cost source of such radiation. The outer surface of the housing is covered with a shielding material 4 such as lead.

The space between the housing and the wire is filled with an ionizable gas. Ordinary air may be used but is subject to the possibility that undesirable catalytic reactions may result between the nitrogen and oxygen with the production of corrosive nitrogen oxides. Consequently I prefer to utilize a relatively inert gas such as nitrogen alone. Obviously other inert gases may be utilized.

In operation a source of electrical energy may be connected to the wire 1 or housing 3, or to both for transmission to a remote point of use. The gaseous substance within the housing, having been ionized by the radioactive material, will also act to conduct the electric current, thus in effect resulting in a composite conductor having a considerable cross-sectional area without a corresponding weight increase as would be the case if the conductor were made of solid metal throughout.

Figure 3:
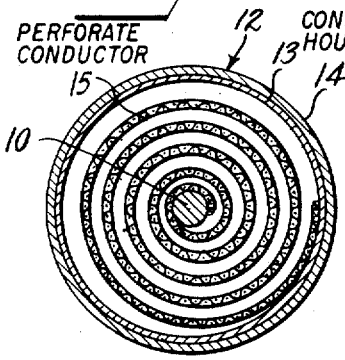
FIGS. 3 to 5 are cross-sectional views similar to FIG. 2, each figure showing a further embodiment of my invention.

The embodiment of conductor 12 shown in FIG. 3 is comprised of an inner metallic wire 10, a metallic housing 13 covered with shielding material 14 and a spiral shaped metallic perforate member 15 in electrically conducting relationship with parts 10 and 13. The inner surface of the housing may or may not be surfaced with radioactive material similar to the surface 6 shown in FIGS. 1 and 2. Parts 10 and 13 may be copper and/or aluminum.

Perforate member 15 may be in the form of a metallic screen or perforated metallic sheet and is preferably made of aluminum in the interest of weight considerations. However, it is obvious that other metals may be utilized. Member 15 is coated or surface alloyed with radioactive material similar to surface 6 of FIG. 1 and is provided with openings therein to enable the gas within the housing to flow freely.

The purpose of the perforate or screen member 15 is to enable the radioactive material thereon to be relatively close to the gas which is to be ionized. Moreover the metallic member 15 will aid in the transmission of electric current.

Figure 4:
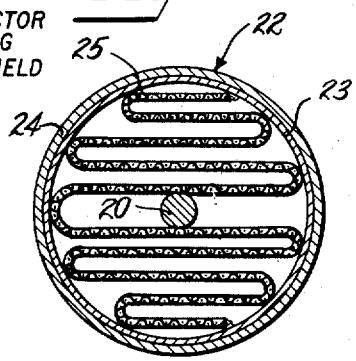

The embodiment of conductor 22 shown in FIG. 4 is similar to that shown in FIG. 3 with the exception of the particular configuration of the perforate member 25. As shown in the figure member 25 is in the form of a plurality of spaced reverse folds in electrically conducting relationship with wire 20 and housing 23. Perforate member 25 has a radioactive surface associated therewith to ionize the adjacent gaseous material. As in the other forms the housing is covered with lead shielding material [4] *24*.

Figure 5:
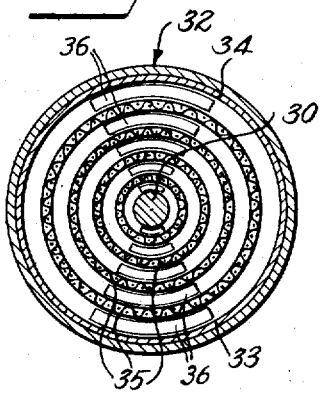

The conductor 32 shown in FIG. 5 is comprised of wire 30, housing 33, shielding material 34 and spaced, coaxial perforate members 35 having radioactive material associated therewith. Members 35 may be supported in any conventional manner, as for example, by spacer blocks 36.

Figure 6:
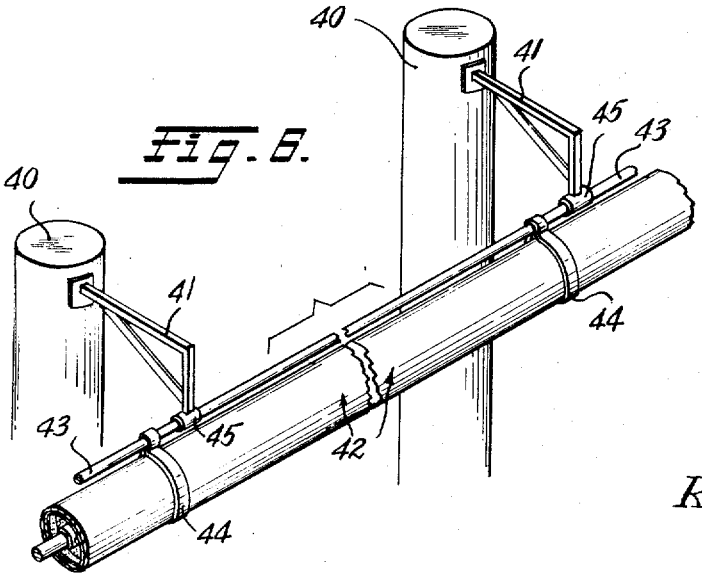
FIG. 6 is a perspective view showing a novel supporting structure for the conductor of my invention.

A structural assembly for supporting the large diameter conductor is illustrated in FIG. 6. As shown in this figure a plurality of upright poles 40, suitably spaced apart, carry bracket members 41. A large diameter conductor 42 is encircled by stirrups or straps 44 which are spaced along the length of the conductor. A cable, or equivalent member *43* extends through the stirrups and also through tubular members *45* on brackets 41.

Having now described and shown several forms of my invention, I wish it to be understood that my invention is not to be limited to the specific forms or arrangements described herein, except insofar as such limitations are specified in the appended claims.

I claim:

1. An electricity conductor comprising a metallic housing, a metallic wire within and spaced from said housing, metallic means connecting said wire and housing in electrical conducting relationship, an ionizable gas in the space between said housing and said wire, and radioactive means associated with said conductor for ionizing said gas.

2. An electricity conductor as in claim 1 in which the wire and housing are formed of copper.

3. An electricity conductor as in claim 1 in which the wire is formed of copper and the housing is formed of aluminum.

4. An electricity conductor as in clam 1 in which the radioactive means is on the inner surface of the housing, and shielding means on the outer surface of the housing.

5. An electricity conductor comprising a metallic wire, a metallic housing surrounding said wire and [sapced] *spaced* therefrom, an ionizable gas in the space between said housing and wire, perforate metal means in the space between said wire and housing, said wire, housing and perforate metal means being in electrically conducting connected relationship and radioactive means associated with said conductor for ionizing said gas.

6. A conductor as set forth in claim 5 in which said wire is copper and said housing is aluminum.

7. A conductor as set forth in claim 5 in which said perforate metal means is formed of aluminum.

8. A conductor as set forth in claim 5 in which said perforate metal means is an aluminum screen.

9. A conductor as set forth in claim 5 in which the gas is an inert gas.

10. A conductor as set forth in claim 5 in which the perforate metal means is in the form of a spiral connected to the wire and to the housing.

11. A conductor as set forth in claim 5 in which the perforate metal means is in the form of a reversely folded structure, the folds of which are spaced from one another.

12. A conductor as set forth in claim 5 in which the perforate metal means is in the form of spaced concentric members, coaxial with the wire.

13. An electricity conductor comprising a metallic wire, a metallic housing surrounding said wire and spaced therefrom, metallic rods connecting said wire and housing, an ionizable gas within said housing, radioactive material within said housing for ionizing said gas, and shielding means on the outer surface of said housing.

14. A conductor of electricity comprising a metallic wire, a metallic housing surrounding said wire, and aluminum screen within said housing, said wire, housing and screen being connected together in electrically conducting relationship.

15. A conductor as set forth in claim 14 in which the housing is formed of aluminum.

*16. A conductor of electricity particularly adapted for long distance transmission of electrical energy comprising two coextensive metallic electrical conductors spaced from each other, and an aluminum screen comprising a plurality of planar plies positioned between the conductors and parallel and coextensive therewith.*

*17. An electrical conductor assembly comprising a cylindrical metallic housing, a copper wire within said housing, and a substantially planar multi-ply aluminum screen member positioned chordally within said housing.*

References Cited

The following references, cited by the Examiner, are of record in the patented file of this patent or the original patent.

UNITED STATES PATENTS

| | | | |
|---|---|---|---|
| 1,955,468 | 4/1934 | Noyes | 174—131 |
| 1,962,041 | 6/1934 | Spong | 174—129 X |
| 2,009,854 | 7/1935 | Meissner | 174—127 |
| 2,056,085 | 9/1936 | Alles. | |
| 2,438,146 | 3/1948 | Candee et al. | 174—36 UX |
| 2,622,208 | 12/1952 | Bernstein. | |
| 3,206,541 | 9/1965 | Jachimowicz. | |
| 3,233,100 | 2/1966 | Lampart. | |

FOREIGN PATENTS

| | | |
|---|---|---|
| 1,230,927 | 5/1963 | France. |

LARAMIE E. ASKIN, Primary Examiner

U.S. Cl. X.R.

174—28, 106 R, 126 R; 250—106 R